(12) United States Patent
Wildisen et al.

(10) Patent No.: US 12,495,772 B2
(45) Date of Patent: Dec. 16, 2025

(54) MONITORING DEVICE FOR AN ANIMAL

(71) Applicant: Xsights Digital Pty Ltd, Fremantle (AU)

(72) Inventors: Steven Wildisen, Fremantle (AU); Dean Phillips, Fremantle (AU)

(73) Assignee: Xsights Digital Pty Ltd (AU)

( * ) Notice: Subject to any disclaimer, the term of this patent is extended or adjusted under 35 U.S.C. 154(b) by 75 days.

(21) Appl. No.: 18/573,059

(22) PCT Filed: Jun. 29, 2022

(86) PCT No.: PCT/AU2022/050666
§ 371 (c)(1),
(2) Date: Dec. 21, 2023

(87) PCT Pub. No.: WO2023/279139
PCT Pub. Date: Jan. 12, 2023

(65) Prior Publication Data
US 2024/0373826 A1    Nov. 14, 2024

(30) Foreign Application Priority Data
Jul. 6, 2021    (AU) ................. 2021902050

(51) Int. Cl.
*A01K 29/00* (2006.01)
*A01K 11/00* (2006.01)
*G06Q 50/02* (2024.01)

(52) U.S. Cl.
CPC .......... *A01K 29/005* (2013.01); *A01K 11/004* (2013.01); *G06Q 50/02* (2013.01); *A01K 11/008* (2013.01)

(58) Field of Classification Search
CPC .. A01K 29/005; A01K 11/004; A01K 11/008; A01K 29/00; G06Q 50/02; H04Q 2209/47; H04W 4/38; H04W 4/80
See application file for complete search history.

(56) References Cited

U.S. PATENT DOCUMENTS 9,848,577 B1    12/2017  Brando et al.
10,779,510 B1 *  9/2020  Moss ................. A61B 5/6815
(Continued)

FOREIGN PATENT DOCUMENTS

| JP | 2008228584 | 10/2008 |
| KR | 1020190125882 | 11/2019 |
| WO | 2019226101 | 11/2019 |

OTHER PUBLICATIONS

International Search Report and Written Opinion for PCT Application No. PCT/AU2022/050666, mailed Sep. 28, 2022, 8 pages.

*Primary Examiner* — John A Tweel, Jr.
(74) *Attorney, Agent, or Firm* — Ganz Law, PC

(57) ABSTRACT

A monitoring device for an animal comprising a body with an aperture for receiving a first part of an ear tag that extends through an ear of the animal. The body comprises a surface area for contacting the ear of the animal. The monitoring device further comprises a processor, a battery and a network. The monitoring device is configured such that, in use, when the first part of an ear tag extends through the ear of the animal and the aperture of the monitoring device, and the second part of the ear tag is fixated to the first part, the monitoring device is positioned between the ear tag and the ear of the animal so that the surface area of the body of the monitoring device is in contact with the ear of the animal to obtain the information indicative of at least the temperature of the animal.

18 Claims, 3 Drawing Sheets

(56) References Cited

U.S. PATENT DOCUMENTS

| | | | |
|---|---|---|---|
| 11,160,251 B2 * | 11/2021 | Florczak | A01K 11/004 |
| 11,793,164 B1 * | 10/2023 | Huang | A01K 11/004 |
| 2009/0115578 A1 * | 5/2009 | Geissler | A01K 11/006 340/10.1 |
| 2016/0157979 A1 | 6/2016 | Dinger et al. | |

* cited by examiner

MONITORING DEVICE FOR AN ANIMAL

TECHNICAL FIELD

The present invention relates to a monitoring device for an animal, such as a farm animal including but not limited to cattle, pigs, and sheep. The present invention also relates to a system for monitoring a plurality of animals.

BACKGROUND

According to The Department of Agriculture, Water, and the Environment (DAWE), more than 2.3 million Australian livestock is exported each year by sea and air, with current health and welfare monitoring of the animals and reporting processes being largely manual, repetitive and resource intensive and therefore costly.

On the farm or during transport-including live export-most measurements are manually collected from individual animals. In addition to being inefficient, some measurements require the animal to be restrained, an action which contributes to elevated stress levels. From a technology perspective, Radio Frequency Identification (RFID) Tags have been used to help understand the location and feeding patterns of animals as they pass through readers on gates and other selected equipment throughout a farm. RFID chips are small and relatively inexpensive but do not transfer live data so can only provide data that can be logged at specific points in time and at a specific location.

More recently, Bluetooth Low Energy (BLE) battery powered Beacons have been used on some farms to transmit location and movement data. However, this technology tends to be quite large and cost prohibitive when deployed at scale. Moments of time do not offer a solution that will assist in the prediction or monitoring of the health of an animal especially if at scale.

It would therefore be advantageous if at least an embodiment of the present invention provided improvements of the known conventional technologies or at least provided a workable alternative.

Any discussion of documents, acts, materials, devices, articles or the like which have been included in the present specification is not to be taken as an admission that any or all of these matters form part of the prior art base or were common general knowledge in the field relevant to the present invention as it existed before the priority date of each claim of this application.

Throughout the specification the word "comprise", or variations such as "comprises" or "comprising", will be understood to imply the inclusion of a stated element, integer or step, or group of elements, integers, or steps, but not the exclusion of any other element, integer or step, or group of elements, integers or steps.

SUMMARY

In accordance with embodiments of the present invention, there is provided a monitoring device for an animal, the monitoring device comprising:
a body comprising an aperture for receiving a first part of an ear tag that extends through an ear of the animal, the body comprising a surface area for contacting the ear of the animal;
a processor configured to obtain information indicative of at least a temperature of the animal when at least a portion of the surface area of the body of the monitoring device is in contact with the ear of the animal;
a battery for providing power to electronic components of the monitoring device; and
a network interface for facilitating wireless communication between the monitoring device and a remote computing device;
wherein the monitoring device is configured such that, in use. when the first part of an ear tag extends through the ear of the animal and the aperture of the monitoring device, and the second part of the ear tag is fixated to the first part of the ear tag, the monitoring device is positioned between the ear tag and the ear of the animal so that the at least a portion of the surface area of the body of the monitoring device is in contact with the ear of the animal to obtain the information indicative of at least the temperature of the animal.

A person skilled in the art will appreciate that ear tags for animals are provided in a range of sizes, forms, and shapes, depending on the type of animal and other specifications. An ear tag suitable for use with embodiments of the present invention comprises a first part that extends through the ear of the animal and a second part that attaches to the first part thereby securing the ear tag to the ear of the animal. The ear tag conventionally comprises a sign with identification information of the individual animal. However, this may no longer be required when using the monitoring device. These types of ear tags are usually worn by the animal during its whole life time.

Embodiments of the present invention provide significant advantages. In particular, by obtaining information indicative of at least the temperature of the animal, for example in real-time, an onset of a disease or any compromises to the wellbeing of the animal may be detected. This allows for an early intervention which may reduce the severity of the impact on a group of animals.

Embodiments of the present invention are suitable for all animals. One specific application includes farm animals, such as livestock. The inventors have found that the monitoring device in accordance with embodiments of the present invention is particularly suitable for cattle, pigs, and sheep.

In an embodiment, the monitoring device is configured to be positioned between the first part of the ear tag and the ear of the animal. Alternatively, the monitoring device may be positioned between the second part of the ear tag and the ear of the animal.

In an embodiment, the monitoring device is configured such that, in use, the at least a portion of the surface area of the body of the monitoring device is in continuous contact with the ear of the animal. This ensures a continuous monitoring of the desired parameters, such as the temperature of the animal.

In an embodiment, the body of the monitoring device is substantially flat. For example, a thickness of the body of the monitoring device may be between 1 mm and 3 mm, in particular between 1.5 mm and 2 mm, such as approximately 1 mm, 1.3 mm, 1.4 mm, 1.5 mm, 1.6 mm, 1.7 mm or 2 mm.

In an embodiment, the body of the monitoring device is substantially ring-shaped. A diameter of the body of the monitoring device may be between 10 mm and 30 mm, in particular between 15 mm and 25 mm, in particular between 20 mm and 25 mm, such as approximately 15 mm, 20 mm or 25 mm.

The body of the monitoring device may be made of a flexible material. In a specific example, a material composition for the body of the monitoring device comprises White PET, PSA or White PET, a black light protection PET layer, encapsulated in polyurethane (PU) housing. However, a person skilled in the art will appreciate that other suitable materials and material compositions are envisaged, including but not limited to polymers and silicones.

The monitoring device may further comprise a housing that encapsulates the body of the monitoring device including the processor, the battery, and the network interface. The main function of the housing is to protect the electronic components of the monitoring device from external influences, such as physical impacts and weather conditions. A suitable material for the housing may, for example, be a polyurethane (PU).

In an embodiment, the battery may be printed, for example, on a flexible polymer film. The printing technology of batteries is particularly advantageous if large numbers of monitoring devices are required to monitor large groups or herds of livestock.

In embodiments of the present invention, the battery may be disposable. For example, depending on the type of animal and other factors such as the type of frequency of obtaining the information and reporting it to the remote computing device, the battery may be configured to provide a duty cycle of up to 5 years or more. In some instances, the capacity of the battery may be selected to provide a duty cycle that aligns with the expected life time of the farm animal.

In some embodiments, a shape of the battery may define a shape of the body of the monitoring device. This is due to the battery typically being the largest component of the monitoring device compared to the processor and other electronic components. For example, the shape of the battery may be substantially ring shaped.

In an embodiment, the processor may comprise a thermal sensor for detecting a temperature of the processor, wherein the monitoring device comprises a heatsink that in use connects the processor with the contact surface for contacting the ear of the animal. In this way, a temperature of the processor can be used as an indication of the temperature of the animal.

In an alternative embodiment, the monitoring device may comprise a temperature sensor for detecting a temperature of the animal, the temperature sensor being in communication with the processor.

In an embodiment, the monitoring device is configured to obtain the information indicative of the temperature of the animal in substantially real-time.

In some embodiments, the monitoring device is configured to obtain information of at least the temperature of the animal and other parameters in relation to the health, wellbeing and behaviour of the individual animal. The information may include but is not limited to: humidity, movement such as speed and/or acceleration, location, dwell, speed, heart rate, feed intake, water intake, and the like.

In an embodiment, the monitoring device may comprise a locating component for determining a substantially real-time location of the animal. This has the particular advantage that if it is determined that an animal is unwell, the animal can be located to be treated or removed from the group of animals if necessary.

In an embodiment, the processor of the monitoring device may obtain the information periodically, for example in 1-minute intervals, in 5-minutes intervals or in 30-minute intervals. A person skilled in the art will appreciate that the periodic intervals may depend on the type of animal and the storage capacity of the monitoring device and may be customisable by a user of the monitoring device. A person skilled in the art will appreciate that alternatively, the processor of the monitoring device may obtain the information continuously and/or on demand.

In an embodiment, the monitoring device may comprise a storage element for storing the obtained information. For example, information may only be stored on the storage element until the information is communicated to a remote computing device via the network interface.

In an embodiment, the obtained information of the monitoring device is automatically communicated to a remote computing device via the network interface. The automatic reporting may be continuously, periodically and/or in case of a trigger condition. A trigger condition may, for example, be that the information indicative of the temperature of the animal falls below or exceeds a predetermined temperature. Such trigger condition may be interpreted by the remote computer device in that the animal experiences a fever or is no longer alive.

The processor of the monitoring device is typically not configured to process the obtained information further. This is typically done by the remote computing device. However, a person skilled in the art will appreciate that in a specific embodiment, the processor may be configured to process at least some of the obtained information, for example, to determine whether the obtained information exceeds or falls below a predetermined threshold. In such case, the processor may identify a trigger condition and may be configured to communicate an alert to the remote computing device via the network interface.

In an embodiment, the monitoring device is allocated identification information that uniquely identifies the animal when the monitoring device is attached to the ear of the animal. The identification information may be stored on a storage element of the monitoring device. In a specific embodiment, the identification information may be obtained by a suitable reader. For example, the identification information may be provided in a way to be readable by an RFID reader such that when the monitoring device detects that an animal is unwell, a person approaching a group of animals can use the RFID reader to correctly identify the animal. However, other suitable methods of identifying the animal are envisaged, including visual identification information on the ear tag.

In an embodiment, the monitoring device may further comprise an output for generating a signal, such as an audio signal or a visual signal. The signal may be activated remotely via the or a further remote computing device. This may simplify locating and identifying an animal.

Embodiments of the present invention relate to a monitoring device for an animal, the monitoring device comprising:
- a first part for extending through an ear of an animal;
- a second part for attaching to the first part to secure the monitoring device to the ear of the animal, the first and/or the second part comprising a surface area for contacting the ear of the animal;
- a processor configured to obtain information indicative of at least a temperature of the animal when at least a portion of the surface area of the monitoring device is in contact with the ear of the animal;
- a battery for providing power to electronic components of the monitoring device; and
- a network interface for facilitating wireless communication between the monitoring device and a remote computing device;
- wherein the monitoring device is configured such that, in use, when the first part extends through the ear of the animal and is attached to the second part, the at least a portion of the surface area of the monitoring device is in contact with the ear of the animal to obtain the information indicative of the temperature of the animal.

In an embodiment, the monitoring device is configured such that, in use, the at least a portion of the surface area of the monitoring device is in continuous contact with the ear of the animal.

Embodiments of the present invention relate to a system for monitoring a plurality of animals, the system comprising a plurality of monitoring devices as described above, wherein the system is configured such that when the plurality of monitoring devices are attached to the respective plurality of animals, the processor of each monitoring device is configured to communicate information indicative of at least a temperature of the respective animal via the network interface to a remote computing device for further analysis.

In accordance with embodiments of the present invention, there is provided a system for monitoring a plurality of animals, the system comprising:

- a plurality of monitoring devices, each monitoring device comprising:
  - a body comprising an aperture for receiving a first part of an ear tag that extends through an ear of an animal, the body comprising a surface area for contacting the ear of the animal;
  - a processor configured to obtain information indicative of at least a temperature of the animal when at least a portion of the surface area of the monitoring device is in contact with the ear of the animal;
  - a battery for providing power to the processor; and
  - a network interface for facilitating wireless communication between the monitoring device and a remote computing device;
- wherein the system is configured such that when the plurality of monitoring devices are attached to the respective plurality of animals, the processor of each monitoring device is configured to communicate information indicative of at least a temperature of the respective animal via the network interface to a remote computing device for further analysis.

In an embodiment, the system may be configured to determine whether the information obtained by a processor of a monitoring device exceeds or falls below a pre-determined threshold. Specifically, the system may comprise a processor for determining whether the information obtained by the monitoring device exceeds or falls below a pre-determined threshold. A person skilled in the art will appreciate that the information is not limited to the information indicative of the temperature of an animal, but may also include other parameters relating to health, wellness and behaviour of the animal, including but not limited to humidity, location, movement (such as speed and/or acceleration), heart rate, food intake, water intake or the like. If the system determines that the information obtained by one or more monitoring devices exceeds or falls below the pre-determined threshold, the system may activate a response. For example, if the system determines that an animal associated with a monitoring device is no longer alive, the system may use location information from the processor of the monitoring device such that the animal can be located and removed if necessary.

In an embodiment, the system may compare the obtained information with historical data to determine thresholds that indicate that the health and wellbeing of an animal is affected. For example, as an outcome of the comparison the system may set different thresholds depending on a type, age, or sex of the animal. This provides the significant advantage that the system can be tailored to diverse groups of animals with the aim to reduce the occurrence of false positives.

In an embodiment, the system may compare the obtained information with historical data to determine information indicative of the wellbeing of an animal. For example, the system may be configured to categorise an animal in one of a plurality of predetermined health categories using the obtained information. The health categories may include but are not limited to: normal/happy, stressed, healthy, fever/sick, and fertile.

Furthermore, the system may analyse the information to generate a prediction model for health of an animal, such as a specific type of animal.

In an embodiment, the system may be configured to automatically generate a report including preselected information derived from the information obtained from the plurality of monitoring devices.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings.

BRIEF DESCRIPTION OF DRAWINGS

Certain exemplary embodiments of the present invention will now be described, by example only, with reference to the accompanying drawings in which.

DESCRIPTION OF EMBODIMENTS

Figure 1:
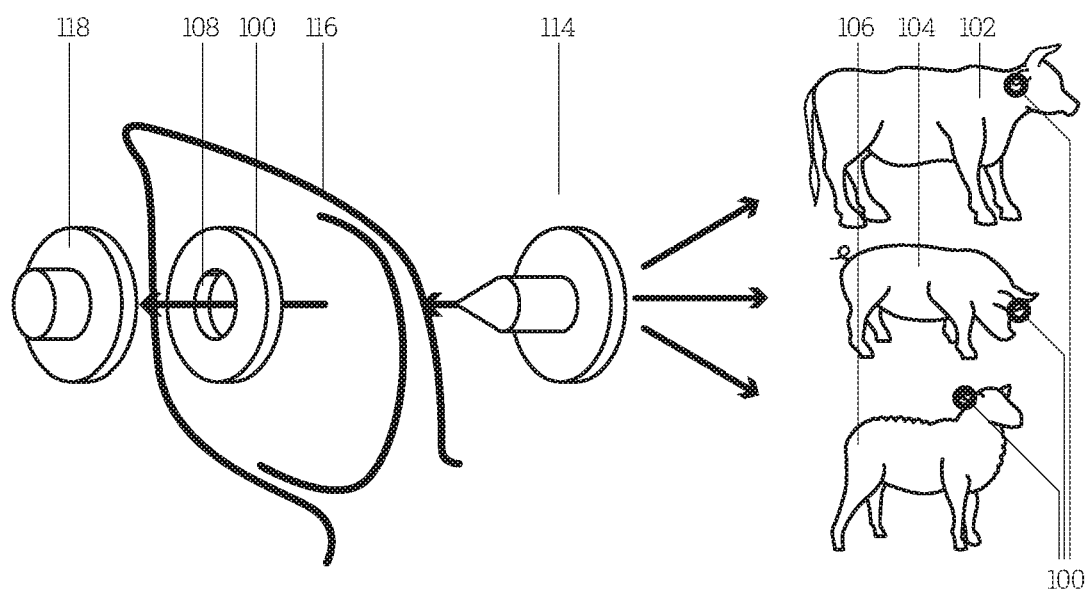
FIG. 1 shows an isometric view of a monitoring device in accordance with an embodiment of the present invention together with an ear tag and an ear of a farm animal.

Embodiments of the present invention generally relate to a monitoring device for an animal and a system for monitoring a plurality of animals. In general, the monitoring device comprises a body with an aperture for receiving a first part of an ear tag that extends through an ear of the animal. The ear tag may be a conventional ear tag that typically comprises a first part that extends through the ear of the animal and a second part that attaches to the first part thereby securing the ear tag to the ear of the farm.

The monitoring device further comprises a processor, such as a micro-processor, configured to obtain information indicative of at least a temperature of the animal, a battery for providing power to electronic components of the monitoring device, and a network interface for facilitating wireless communication between the monitoring device and a remote computing device.

The monitoring device is configured such that, in use, when the first part of the ear tag extends through the ear of the animal and the aperture of the monitoring device, and the second part of the ear tag is attached to the first part of the ear tag, the monitoring device is positioned between the ear tag and the ear of the animal. For example, the monitoring device may be positioned between the first part of the ear tag and the ear, or between the second part of the ear tag and the ear. In this position, the monitoring device is configured such that a surface area of the body of the monitoring device is in contact with the ear of the animal such that the processor can obtain the information indicative of at least the temperature of the animal.

Such monitoring device may be used in combination with a computer system for monitoring a plurality of animals. The system is particularly advantageous for monitoring relatively large groups of animals, for example, where the number of farm animals are within the hundreds or thousands. Each individual animal may be equipped with a respective monitoring device such that the health, wellbeing and/or behaviour of each individual animal can be monitored. This provides the significant advantage that an onset of a disease or any compromises to the wellbeing of an individual animal can be detected early. Early detection can minimise the negative impact of disease, injury, and failures of equipment on the health, welfare and productivity of individual animals and groups of animals. Specifically, having the capability to utilise and access information of individual animals, the system may identify an onset of disease or compromises to welfare at an early stage. This allows for early interventions, thereby reducing the severity of the impact on growth performance, mortality and spread of disease.

In addition to the temperature, the monitoring device may be configured to obtain information indicative of other parameters relating to the health, wellbeing and/or behaviour of the animal as will be described further below. Apart from detecting an onset of a disease, the obtained information may be indicative of an increased fertility of an individual animal which may assist in identifying animals for the purpose of breeeding. Another advantage of obtaining the described information is that behaviour patterns of individual animals—as well as groups of animals—can be monitored and analysed. This may allow for the generation of a model containing a plurality of pre-set categories and thresholds depending on the type, age and sex of the animal.

Figure 2:
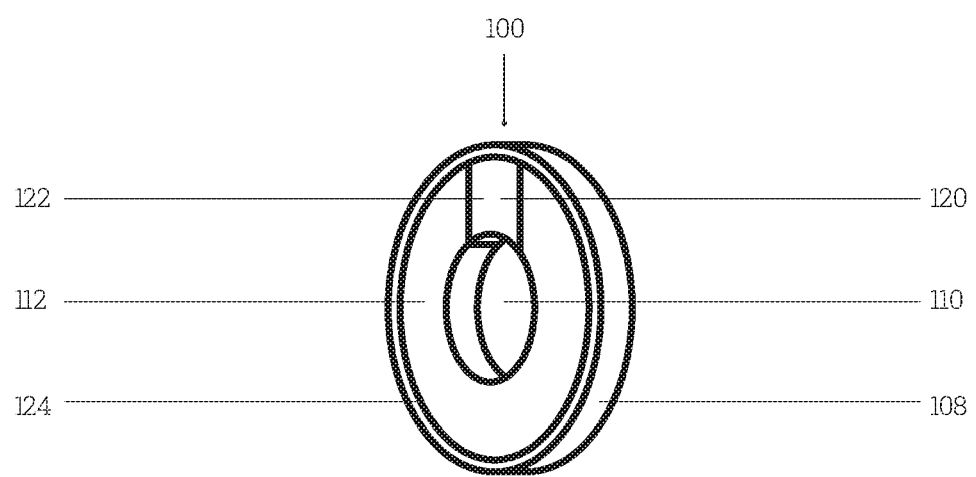
FIG. 2 shows the monitoring device of FIG. 1 in isolation.

Referring now to FIGS. 1 and 2 of the accompanying drawings, there is shown a monitoring device 100 specifically for a farm animal in accordance with an embodiment of the present invention. The farm animal may be any suitable farm animal, including but not limited to livestock, such as cattle 102, pigs 104 and sheep 106. Whilst the described embodiments show a monitoring device 100 for farm animals, a person skilled in the art will appreciate that the monitoring device may be applied to any suitable animals where it is desired to monitor parameters in relation to health, wellbeing and/or behaviour. Examples include but are not limited to animals in the wild, held in animal parks, on farms, or in laboratories.

The monitoring device 100 comprises a body 108 with an aperture 110. In this particular example, the size and shape of the body 108 are defined by the battery 112 of the monitoring device 100 due to the battery 112 being the largest component of the monitoring device 100 in this example. The battery 108 is a printed ring-shaped battery 112 with a capacity that is selected to provide a duty lifecycle of up to 2 years. This capacity has been selected to align with a typical lifetime of livestock. For example, the typical lifetime of beef cattle is between 18-24 months, and of fattening pigs between 6-7 months. However, a person skilled in the art will appreciate that any suitable type of battery and capacity are envisaged.

The monitoring device 100 in this embodiment of the present invention is suitable for use with existing ear tags that are attached to the ear of a farm animal 102, 104, 106. Specifically, in this example the ear tag suitable for the monitoring device 100 comprises a first part 114 that in use extends through the ear 116 of the farm animal 102, 104, 106, and a second part 118 that attaches to the first part 114 thereby securing the ear tag to the ear 116 of the farm animal 102, 104, 106. The monitoring device 100 is configured such that, in use, when the first part 114 of the ear tag extends through the ear 116 of the farm animal 102, 104, 106, the first part 114 also extends through the aperture 110 of the body 108 of the monitoring device 100. When the second part 118 of the ear tag is fixated to the first part 114, the monitoring device 100 is positioned between the second part 118 of the ear tag and the ear 116 of the farm animal 102, 104, 106 in a way so that a surface area of the body 108 of the monitoring device 100 is in substantially continuous contact with the ear 116 of the farm animal 102, 104, 106. Alternatively, the monitoring device 100 may be positioned between the first part 114 of the ear tag and the ear 116 of the farm animal 102, 104, 106. In this way, the monitoring device 100 is able to obtain the desired information in relation to the health, well-being and/or behaviour of the farm animal 102, 104, 106.

In this particular example, a size of the monitoring device 100 is similar to a size of the ear tag. Specifically, the body 108 of the monitoring device 100 is substantially flat with a width of the monitoring device 100 being 1.5 mm and a diameter of 25 mm. A person skilled in the art will appreciate that the body 108 of the monitoring device 100 may have any suitable shapes and sizes. For example, a thickness of the body 108 of the monitoring device 100 may be between 1 mm and 3 mm, in particular between 1.5 mm and 2 mm, such as approximately 1 mm, 1.3 mm, 1.4 mm, 1.5 mm, 1.6 mm, 1.7 mm or 2 mm. A diameter of the body 108 of the monitoring device 100 may be between 10 mm and 30 mm, in particular between 15 mm and 25 mm, in particular between 20 mm and 25 mm, such as approximately 15 mm, 20 mm, 25 mm or 30 mm. A shape and size of the aperture 110 of the monitoring device 100 may be selected to match a shape and size of the first part 114 of the ear tag. For example, the shape and size of the aperture 110 may be selected to provide for a tight fit with the first part 114 of the ear tag. This ensures that in use the monitoring device 100 does not move uncontrollably between the two parts 114, 118 of the ear tag as this may negatively affect the consistency of obtaining the information by the monitoring device 100.

Figure 3:
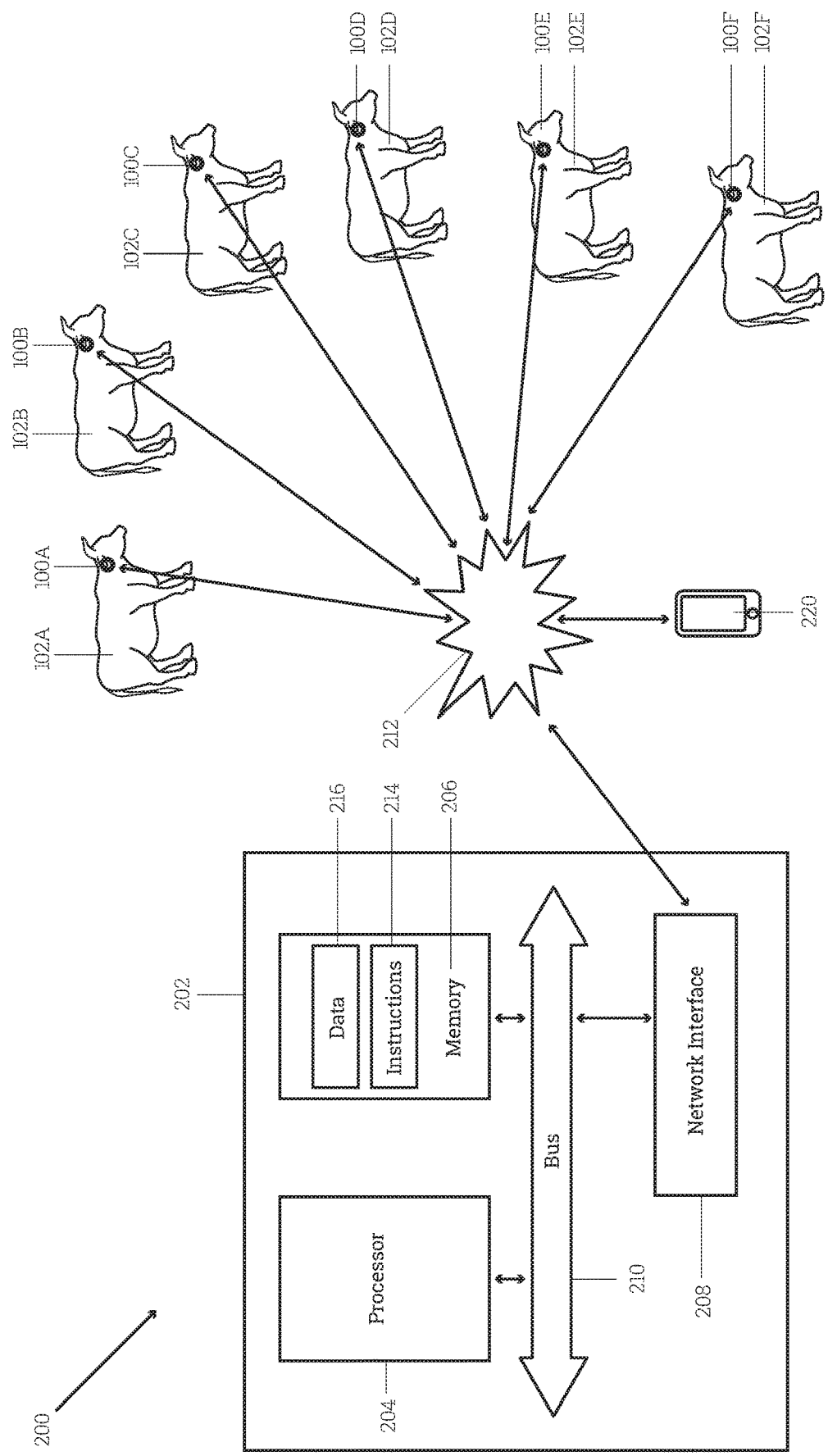
FIG. 3 shows a schematic view of a system for monitoring a plurality of farm animals in accordance with a further embodiment of the present invention.

The monitoring device 100 further comprises a processor 120 for processing information and a network interface 122 for wirelessly communicating information to and from a remote computing device, such as computing device 202 illustrated in FIG. 3. A person skilled in the art will appreciate that any wireless communication technology is envisaged. Suitable wireless communication technologies include but are not limited to Bluetooth, near field, Long Range (LORA), Wi-Fi, RFID, and radio frequency (RF). In this specific embodiment, the monitoring device 100 is configured to facilitate wireless communication using Bluetooth. In this regard, the network interface 122 of the monitoring device 100 comprises a Bluetooth module. Using Bluetooth has the specific advantages that it can also be used to determine a substantially real-time position of the monitoring device 100. This is particularly advantageous if an animal needs to be correctly identified within a group of animals and removed if necessary.

A person skilled in the art will appreciate that any suitable information may be communicated from the monitoring device 100 to the remote computing device. For example, the information communicated from the monitoring device 100 to the remote computing device may include information indicative of the temperature of the animal as well as identification information to uniquely identify the farm animal 102, 104, 106 that is associated with the monitoring device 100. The remote computing device may be one or more administrator computing device(s) to make information available to an administrator. In general, the remote computing device may be in the form of any communication enabled computing device, such as a smartphone, a tablet computer, a personal computer, a laptop computer, or a PDA.

In this example, the monitoring device 100 is configured to obtain information in relation to a plurality of health parameters of the farm animal. When the monitoring device 100 is attached to a farm animal's ear 116 by virtue of a conventional ear tag 114, 118, the surface area of the monitoring device 100 defining the probe is in substantially continuous contact with the ear 116 of the farm animal 102, 104, 106. This allows for the consistent collection of information in relation to the health, well-being and behaviour of the farm animal 102, 104, 106. For example, the monitoring device 100 may be configured to obtain the information indicative of at least the temperature in substantially real time. This may be achieved by obtaining the information periodically, continuously and/or on demand.

A first health parameter relates to information indicative of a temperature of the farm animal 102, 104, 106. By obtaining information indicative of a temperature of a farm animal 102, 104, 106, a determination may be made on the current health status of the farm animal 102, 104, 106. For example, if the information indicative of the temperature exceeds a predetermined threshold, it may indicate that the farm animal 102, 104, 106 experiences a fever that could be caused by a disease. If the information indicative of the temperature falls below a predetermined threshold, it may indicate that the farm animal 102, 104, 106 is no longer alive and needs to be removed from the group of animals.

The processor 120 of the monitoring device 100 shown in FIGS. 1 and 2 comprises a thermal sensor (not shown) for detecting a temperature of the processor 120 itself. The processor 120 is connected to a heatsink (not shown) that extends to a surface area of the monitoring device 100 thereby defining a probe where the temperature of the ear 116 of the farm animal 102, 104, 106 can be detected. Thus, by detecting the temperature of the processor 120, information indicative of the temperature of the farm animal 102, 104, 106 can be determined. Utilising the temperature of the processor 120 itself provides the advantage that the design and construction of the monitoring device 100 can be simplified in that complex sensors are not required. As a consequence, the monitoring device 100 in accordance with embodiments of the present invention can be mass produced at a cost-effective price that allows for an application of the monitoring device 100 to large groups of farm animals.

Even though the monitoring device 100 as shown in FIGS. 1 and 2 obtains information indicative of the temperature of the farm animal by detecting the temperature of the processor, a person skilled in the art will appreciate that the monitoring device in accordance with embodiments of the present invention may alternatively comprise one or more sensors, including but not limited to a temperature sensor for detecting a temperature of the farm animal.

Other health parameters that can be monitored by the processor 120 of the monitoring device 100 include but is not limited to: humidity, movement (such as speed and/or acceleration), location, dwell, speed, heart rate, feed intake, and water intake. The obtained information may be analysed individually or preferably in combination with each other to assist in make a determination of the health status of an animal.

By monitoring a plurality of parameters in relation to heath, well-being and/or behaviour, changes in movement speed or type, temperature or feeding habits can be automatically logged. Further, the obtained information may be used to determine a health model for a specific type of farm animal 102, 104, 106. The health model may define a range of parameters that are indicative of a healthy animal, based on type of the animal, age range and sex. Furthermore, thresholds in parameters may be defined such that farm animals 102, 104, 106 can be categorised. For example, individual farm animals 102, 104, 106 may be categorised to be healthy, happy, sick, stressed and/or fertile.

With regard to information indicative of the location of the farm animal 102, 104, 106, the monitoring device 100 may comprise a locating component for determining a substantially real-time location of the farm animal 102, 104, 106. This has the particular advantage that if it is determined that a farm animal 102, 104, 106 is unwell or no longer alive, the farm animal 102, 104, 106 can be located and treated or removed from the group of farm animals if necessary. The locating component may further be configured to measure a speed of movement of the animal and/or the position of the animal relative to the ground.

In this particular example, the network interface 122 of the monitoring device 100 is in the form of a Bluetooth module. The Bluetooth module can also be used to determine a substantially real-time position of the monitoring device 100 and thus the farm animal 102, 104, 106. However, a person skilled in the art will appreciate that the monitoring device 100 may comprise one or more other suitable geolocation components to determine a substantially real-time position of the farm animal 102, 104, 106. Such geolocation components may utilise any suitable positioning method to determine a real-time position of the monitoring device 100, including but not limited to GPS, Wi-Fi, and LORA.

In this example, the monitoring device 100 further comprises an internal storage (not shown). The internal storage may be used to store identification information together with the obtained information. For example, depending on the capacity of the internal storage, some information may only be stored temporarily until the information is communicated via the network interface 122 to a remote computing device. Further, depending on the storage capacity of the internal storage, the processor 120 of the monitoring device 100 may request the information continuously or periodically, for example in 30-second intervals, in 1-minute intervals, in 5-minute intervals or in 30-minute intervals. A person skilled in the art will appreciate that the intervals may depend on many different factors, such as the type of farm animal 102, 104, 106 and the purpose of obtaining the information. Additionally, or alternatively, the processor 120 of the monitoring device 100 may obtain the information on demand, for example, by receiving a request from the remote computing device via the network interface 122. A person skilled in the art will appreciate that the schedule and mode of obtaining information may be customisable by a user of the remote computing device.

Similar considerations apply to the reporting of information from the monitoring device 100 to the remote computing device. In this particular example, the processor 120 is configured to communicate the obtained information to the remote computing device automatically. Specifically, the information is automatically communicated to the remote computing device periodically. In this particular example, the processor 120 is only configured to request, store and communicate the obtained information. The information is further processed and analysed by the remote computing device.

However, in other examples, a processor of the monitoring device 100 may determine a trigger condition. An exemplary trigger condition may exist when information indicative of the temperature exceeds or falls below a predetermined threshold. For example, an increased temperature of the farm animal 102, 104, 106 may indicate a fever, whereas a decreased temperature of the farm animal 102, 104, 106 may indicate that the farm animal 102, 104, 106 is no longer alive or that the surface area of the monitoring device 100 is no longer in contact with the ear 116 of the farm animal 102, 104, 106. In such circumstances, the processor of the monitoring device 100 may automatically communicate the information to the remote computing device which may initiate a response to locate and attend to the farm animal in question.

Furthermore, when the processor of the monitoring device 100 or the remote computing device determines that the obtained information exceeds or falls below a predetermined threshold, a signal at the monitoring device 100 may be activated. The signal may, for example, be a visual signal, such as a flashing light, or an audio signal, such as an alarm. The signal may be automatically activated or alternatively, may be activated by a user of the remote computing device. For example, the temperature of a farm animal may exceed the predetermined threshold which indicates that the farm animal presents a fever. In such circumstance, a response may be initiated to locate the animal. Even with the assistance of locating components that provide the real-time position of the animal, for example, on a map, the task of correctly identifying the animal within a group of moving animals will likely be difficult. As such, a visual and/or audio signal may assist in locating the animal within a group of animals.

Referring back to FIGS. 1 and 2 of the accompanying drawings, the monitoring device 100 further comprises a housing 124 that encapsulates the body 108, the battery 112, and other electronic components of the monitoring device 100, including the processor 120, the network interface 122 and the internal storage. The housing 124 may be made of a flexible material, such as silicon, to increase comfort for the farm animal 102, 104, 106. Furthermore, the housing 124 may be configured to protect the components of the monitoring device 100 from external impact to ensure the required life span of the monitoring device 100 before the monitoring device 100 is discarded.

In the example shown in FIGS. 1 and 2 of the accompanying drawings, the monitoring device 100 is used in combination with an existing ear tag that comprises first and second parts 114, 118 that are attached to an ear 116 of the farm animal 102, 104, 106. In an alternative embodiment (not shown), the monitoring device comprises the ear tag. In this alternative embodiment, the monitoring device itself is configured to form an ear tag for attaching to the ear of a farm animal. In particular, the monitoring device comprises a first part for extending through an ear of a farm animal, and a second part for attaching to the first part to secure the monitoring device to the ear of the farm animal. The first and/or the second part comprise(s) a surface area for contacting the ear of the farm animal. The monitoring device also comprises a processor configured to obtain information indicative of at least a temperature of the farm animal when at least a part of the surface area of the monitoring device is in contact with the ear of the farm animal. As such, it may be advantageous to provide the processor within the first part as the first part of the monitoring device as this part will extend through the ear of the farm animal and therefore be in continuous contact with the ear. The monitoring device further comprises a battery for providing power to electronic components of the monitoring device and a network interface for facilitating wireless communication between the monitoring device and a remote computing device. Similar to the monitoring device 100, the monitoring device in accordance with this particular embodiment is configured such that when the first part extends through the ear of the farm animal and is attached to the second part, the surface area of the monitoring device is in contact with the ear of the farm animal to obtain the information indicative of the temperature of the farm animal.

Referring now to FIG. 3 of the accompanying drawings, there is shown a system 200 for monitoring a plurality of farm animals 102. The system 200 comprises a computing device 202 such as an administrator platform that may be in the form of a computer server. The system 200 further comprises a plurality of monitoring devices 100A-100F, each of which is the same as monitoring device 100 described above. Each monitoring device 100A-100F is attached to a respective farm animal 102A-102F with the aid of a conventional ear tag. In this example, the farm animal is illustrated as cattle 102. However, a person skilled in the art will appreciated that any other suitable animal is envisaged. The computing device 202 which in this example functions as an administrator platform is remote relative to the plurality of monitoring devices 100A-100F. This provides the significant advantage that a user of the computing device 202 may monitor a large group of farm animals irrespective of the location of the farm animals. For example, the user of the computing device 202 may monitor the plurality of farm animals during their entire lifecycle, starting from the farm, during transport and ending at the abattoir where the monitoring devices 100 are typically discarded.

The computing device 202 includes a processor 204 configured to control and coordinate operations, a memory 206 and a network interface 208 that communicate with each other via a bus 210. The network interface 208 facilitates wireless communications between the computing device 202 and each of the plurality of monitoring devices 100 via a network 212, such as the Internet. A person skilled in the art will appreciate that any suitable network technology (or combination) may be utilised for embodiments of the present invention, including but not limited to the Internet, wide area network (WAN), local area network (LAN), and Bluetooth.

The memory 206 stores instructions 214 and data 216 for the processes as described in the present application, and the processor 204 performs the instructions 214 from the memory 206 to implement the processes. It should be noted that although the computing device 202 is shown as an independent network element, the computing device 202 may alternatively be part of another network element, and functions performed by the computing device 202 may be distributed between multiple network elements.

In general, the system 200 is configured such that when the plurality of monitoring devices 100A-100F are attached to the respective plurality of farm animals 102A-102F, the processor of each monitoring device 100 is configured to communicate information indicative of at least a temperature of the respective farm animal 102 via the network 212 to the remote computing device 202. In this particular example, each monitoring device 100 is configured to communicate information indicative of a plurality of health parameters to the remote computing device 202 in pre-set intervals.

When the information is received at the network interface 208 of the computing device 202, the processor 204 may store the information on the memory 206 or in an external memory, such as cloud storage. The processor 204 may further process the obtained information for analysis. For example, the processor 204 may determine whether the obtained information, such as the temperature of an individual farm animal, exceeds or falls below a predetermined threshold. A person skilled in the art will appreciate that the information is not limited to the information indicative of the temperature of a farm animal, but may also include information indicative of humidity, location, movement (such as speed and/or acceleration), heart rate, food intake, water intake or the like. In this way, changes in movement speed or type, temperature or feeding habits can automatically be logged.

If the processor 204 of the system 200 determines that the information obtained by one or more monitoring devices 100A-100F exceeds or falls below a pre-determined threshold, the processor 204 may initiate a response. For example, if the processor 204 determines that farm animal 102E associated with monitoring device 100E presents a fever, the processor 204 may obtain real-time location information from the processor of the monitoring device 100E such that the farm animal 102E can be located within the group of animals and treated or removed if necessary. Each monitoring device 100A-100F is allocated identification information that uniquely identifies the respective farm animal 102A-102F when the monitoring device 100A-100F is attached to the ear of the farm animal 102A-102F. This information allows the processor 204 to track the health parameters of each individual farm animal 102A-102F. This information may be used to generate a health model of the specific type of farm animal, for example depending on breed, age, and sex. In particular, the processor 204 of the system 200 may use the information received from the plurality of monitoring devices 100A-100F to set the thresholds mentioned above. A person skilled in the art will appreciate that the thresholds may differ depending on type, breed, age, and sex of the animal. Even more so, the thresholds may differ depending on external effects, such as weather, season, geographical location, and the like. For example, the threshold indicating a fever in cattle may be different to the threshold in pigs. The set thresholds may be used to define a plurality of health categories, including but not limited to: normal/happy, stressed, healthy, fever/sick, and fertile.

In one example, the processor 204 of the system 200 may use historical information that has been obtained over time to set one or more thresholds. By comparing substantially real-time information obtained from an individual farm animal to historical information, the system 200 may generate one or more health categories that the farm animal may fall into. Thus, the processor 204 of the system 200 may use real-time information to categorise each farm animal 102A-102F in one of the plurality of predetermined health categories. Once the processor 204 determines that a farm animal moves from one category to another, an alert may be triggered, and a response initiated if necessary.

Further, the processor 204 may use information that has been collected over time to generate a prediction model which allows early identification of an onset of a disease or other factors that may impact a group of farm animals.

In a further example, the processor 204 of the system 200 may use the substantially real-time information obtained from the group of farm animals 102A-102F to set one or more thresholds or to adjust the one or more thresholds that were set based on historical information. Setting thresholds relative to the group of farm animals allows the system 200 to compare information of an individual farm animal with that of a plurality of farm animals to which group the individual farm animal belongs. For example, due to seasonal effects on the animals' temperature, the group of farm animals 102A-102F may all present an elevated temperature. In other circumstances this elevated temperature may indicate a fever or another disease. However, given that all animals within a group of farm animals 102A-102F present an elevated temperature, the processor 204 may adjust the thresholds accordingly.

The computing device 202 may further be configured to make some information available to another remote computing device, such as mobile computing device 220. In this regard, information received by the processor 204 may be processed and transmitted to the mobile computing device 220 using the network interface 208. Specifically, the computing device 202 may be accessible by the mobile computing device 220 through web pages served to the computing device 220. This may be realised by software implemented by the processor, and through an application programming interface (API) that communicates with the computing device 220 using a dedicated application installed on the computing devices 220.

In this example, the mobile computing device 1220 may also include a display and location-presentation resources to enable mapping or similar presentations using location information relating a monitoring device 100 and the associated farm animal 102. For example, if it is determined that information obtained by monitoring device 100C exceeds or falls below a predetermined threshold, maps can be stored and/or retrieved from the memory to present the real-time location of the associated farm animal 102C. The real-time location may be displayed relative to the other plurality of monitoring devices 100A, 100B, 100D, 100E, 100F and therefore the respective farm animal 102A, 102B, 102D, 102E, 102F.

The system 200 may further be configured to automatically generate a digital report including preselected information derived from the information obtained from the plurality of monitoring devices 100A-100F. Automatically generating digital reports provides significant advantages, in particular during the transport of the farm animals as it significantly reduces the paperwork.

It will be appreciated by persons skilled in the art that numerous variations and/or modifications may be made to the invention as shown in the specific embodiments and/or aspects without departing from the spirit or scope of the invention as broadly described. For example, it will be apparent that certain features of the invention can be combined to form further embodiments. The present embodiments and aspects are, therefore, to be considered in all respects as illustrative and not restrictive. Several embodiments are described above with reference to the drawings.

These drawings illustrate certain details of specific embodiments that implement the systems and methods and programs of the present invention. However, describing the invention with drawings should not be construed as imposing on the invention any limitations associated with features shown in the drawings.

The invention claimed is:

1. A monitoring device for use with a two-part ear tag for an animal, the monitoring device comprising:
a body that is shaped to comprise an aperture for receiving a first part of the two-part ear tag that extends through an ear of the animal, the body defining an external surface area for contacting the ear of the animal;
a processor housed within the body and configured to obtain information indicative of at least a temperature of the animal when at least a portion of the external surface area of the body of the monitoring device is in contact with the ear of the animal;
a battery housed within the body and configured to provide power to electronic components of the monitoring device; and
a network interface housed within the body and configured to facilitate wireless communication between the monitoring device and a remote computing device;
wherein the monitoring device is configured such that, in use, when the first part of the two-part ear tag extends through the ear of the animal and the aperture of the monitoring device, and a second part of the two-part ear tag is fixated to the first part of the two-part ear tag, the monitoring device is positioned between the two-part ear tag and the ear of the animal so that the at least a portion of the external surface area of the body of the monitoring device is in contact with the ear of the animal to obtain the information indicative of at least the temperature of the animal.

2. The monitoring device of claim 1, wherein the body of the monitoring device is substantially flat.

3. The monitoring device of claim 1, wherein the body of the monitoring device is substantially ring-shaped.

4. The monitoring device of claim 1, wherein the battery is a printed battery.

5. The monitoring device of claim 1, wherein the processor comprises a thermal sensor for detecting a temperature of the processor, and wherein the monitoring device comprises a heatsink that in use connects the processor with the contact surface for contacting the ear of the animal.

6. The monitoring device of claim 1, wherein the monitoring device is configured to obtain the information indicative of the temperature of the animal in real-time.

7. The monitoring device of claim 1, being configured to obtain information of the temperature of the animal and other parameters in relation to the health of the individual animal, the information being one or more of: humidity, movement, speed, acceleration, location, dwell, speed, heart rate, feed intake, and water intake.

8. The monitoring device of claim 1, wherein the monitoring device comprises a locating component for determining a substantially real-time location of the animal.

9. The monitoring device of claim 1, wherein the processor is configured to obtain the information periodically.

10. The monitoring device of claim 1, wherein the network interface of the monitoring device comprises a Bluetooth module.

11. The monitoring device of claim 1, being configured such that the obtained information of the monitoring device is automatically communicated to the remote computing device via the network interface.

12. A system for monitoring a plurality of animals, the system comprising:
a plurality of monitoring devices according to claim 1,
wherein the system is configured such that when the plurality of monitoring devices are attached to the respective plurality of animals, the processor of each monitoring device is configured to communicate information indicative of at least a temperature of the respective animal via the network interface to a remote computing device for further analysis.

13. The system of claim 12, being configured to determine whether the information obtained by a processor of a monitoring device exceeds or falls below at least one pre-determined threshold.

14. The system of claim 13, wherein if the system determines that the information exceeds or falls below the pre-determined threshold, the system activates a response process.

15. The system of claim 13, being configured to process the obtained information to determine the at least one threshold.

16. The system of claim 15, being configured to use the at least one determined threshold to generate a health model for the plurality of animals, the health model comprising a plurality of predetermined health categories including: normal/happy, stressed, healthy, fever/sick, and fertile.

17. The system of claim 12, being configured to process the obtained information to automatically generate a report including pre-selected information derived from the information obtained from the plurality of monitoring devices.

18. The monitoring device of claim 1, wherein the body is made of a flexible material, encapsulated in polyurethane (PU) housing.

* * * * *